United States Patent [19]
Johnson, Jr.

[11] 3,818,753
[45] June 25, 1974

[54] DEFLECTION TESTER
[76] Inventor: Victor C. Johnson, Jr., 673 Nakoma Dr., Jackson, Miss. 39206
[22] Filed: Oct. 12, 1972
[21] Appl. No.: 297,001

Related U.S. Application Data
[63] Continuation of Ser. No. 75,871, Sept. 28, 1970, abandoned.

[52] U.S. Cl. .................................................. 73/94
[51] Int. Cl. ............................................. G01n 3/08
[58] Field of Search.......................... 73/89, 94, 101

[56] References Cited
UNITED STATES PATENTS
2,078,296 4/1937 Vadner ................................... 73/89
2,447,586 8/1948 Marshall ................................. 73/89
2,691,886 10/1954 Cole........................................ 73/94
2,699,060 1/1955 Safford ................................... 73/94
2,746,288 5/1956 Scott....................................... 73/94
3,035,437 5/1962 Watkins et al........................... 73/94

Primary Examiner—Herbert Goldstein
Attorney, Agent, or Firm—Pennie & Edmonds

[57] ABSTRACT

Improvement in apparatus for testing the quality and durability of bituminous paving mixtures comprising a flow measurement device attached to such apparatus and being actuated by means operatively connected to the specimen of bituminous paving mixture being tested.

1 Claim, 4 Drawing Figures

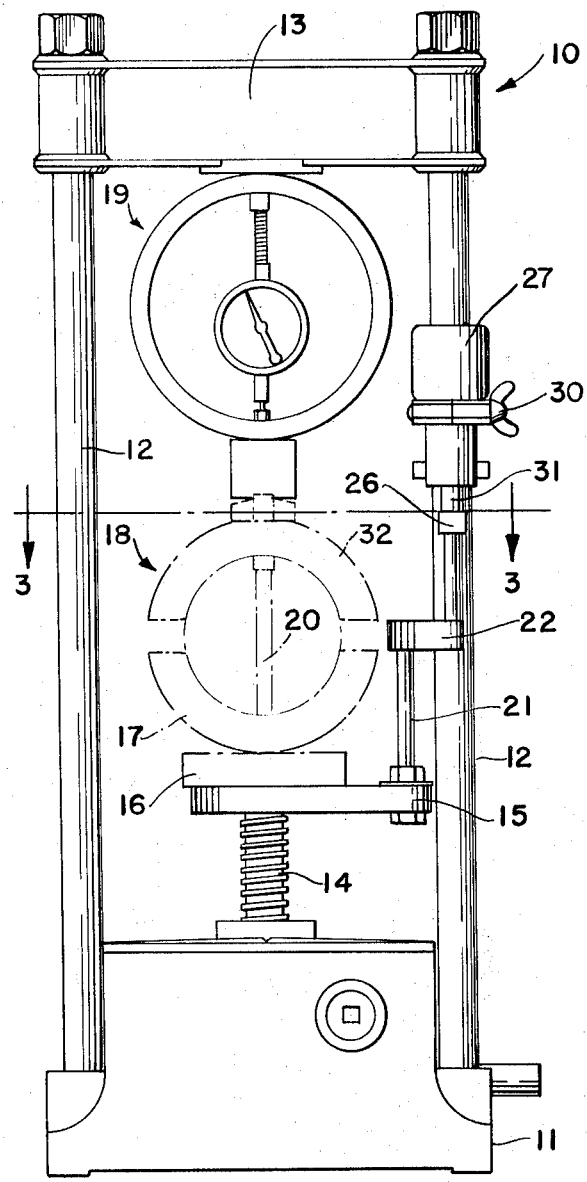

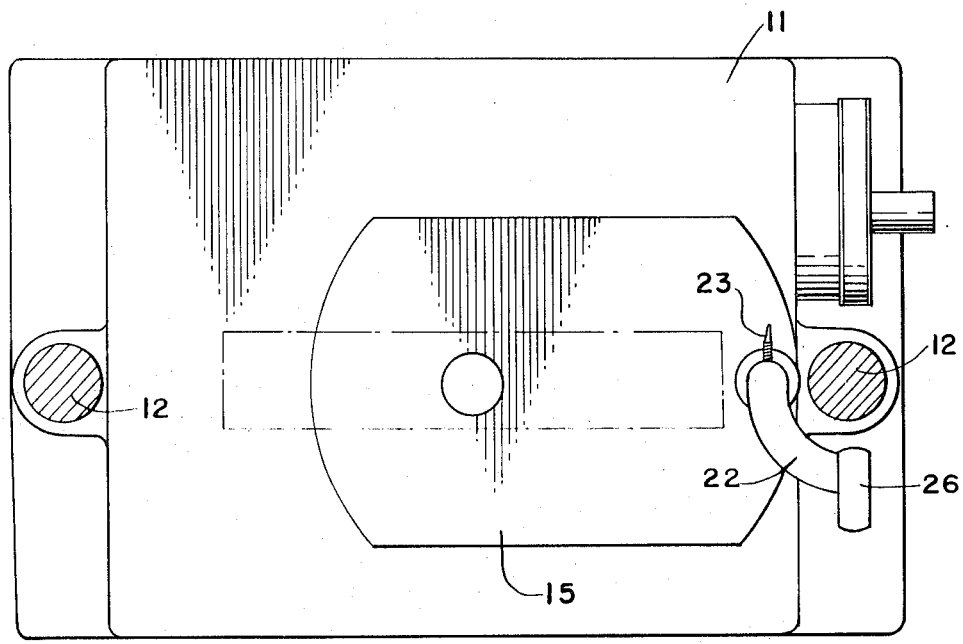
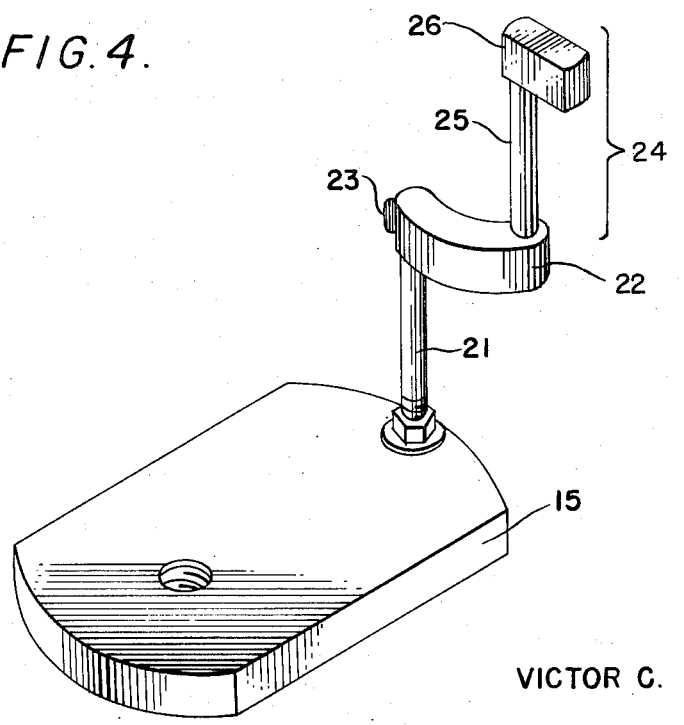

3,818,753

DEFLECTION TESTER

This is a continuation, of application Ser. No. 75,871, filed Sept. 28, 1970 now abandoned.

BACKGROUND OF THE INVENTION

In the paving of highways, airport runways, and other surfaces, differing bituminous paving formulations are used, depending upon the conditions that must be withstood by the resultant paved surface. Users order the particular composition desired from a plant which then prepares the paving mixture for delivery to the site where it is to be laid. Users of such paving mixtures have for a number of years sought to insure that the paving material delivered for use had the properties desired, one of the important properties being the flow value. Flow value is an index of plasticity of the paving composition or the resistance of the paving to distortion under heavy forces such as that due to traffic.

Heretofore, a commercially suitable method and apparatus for the purpose of testing specimens of paving material have been that disclosed in U.S. Pat. Nos. 2,471,227 and 2,447,586 to Marshall. Basically, the apparatus and method therein disclosed prepare samples for the testing of paving mixtures in which the machine directly measures stability by measuring the compression shear of samples of the paving material. Attempts to measure the flow value of mixtures using the Marshall apparatus have not been, however, successful. This is due to the fact that the flow measurement device used has to be held by hand and the reading taken as soon as the tester determines that the measurement stability reading has been obtained, thereby manually removing the dial. Since hand pressure is used in carrying out this test, it will be evident that the test results vary widely dependent on the person carrying out the test. The net result is readings which may not correlate with results obtained by the laboratory job mix formula. Moreover, such results vary so widely as to render uncertain whether a paving mixture does meet the specifications desired by the user.

SUMMARY OF THE INVENTION

An improvement has now been found by which flow value can be accurately tested without the use of hand pressure of individual testers which varies widely.

Briefly stated, the present invention comprises an improvement in apparatus for determining the quality and durability of bituminous paving mixtures by testing specimens of such paving mixtures, said apparatus having a base, uprights extending from outer portions of said base, a jackhead mounted on a screw jack from a central portion of said base, upper and lower mold members and means removably supporting the mold members in a vertical position upon said jackhead, the improvement comprising an upstanding rod affixed to an end of said jackhead, an arm pivotally mounted on the upper end of said rod, a flow measurement device attached to said apparatus, and means connected to said arm and adapted to engage and actuate said flow measurement device during testing.

DESCRIPTION OF THE DRAWINGS

FIG. 1 is a front elevational view of the tester of the present invention;

FIG. 2 is a side elevational view of the tester;

FIG. 3 is a sectional view taken alone line 3-3 of FIG. 1; and

FIG. 4 is a perspective view of a portion of the flow value testing section of the tester.

DETAILED DESCRIPTION

Referring to the drawings, there is shown a testing apparatus 10 comprising a base 11, uprights 12, a top cross piece 13 and a screw jack 14. Affixed on the screw jack 14 is a jackhead 15 to which is mounted a base plate 16 on which is affixed the lower arc 17 of a test mold 18. There is also shown a proving ring and dial 19 but not shown are conventional means, such as a motor with a pulley arrangement, for driving the jack.

The foregoing is essentially the device disclosed in the Marshall patents noted above for testing specimens of paving mixtures, compaction of the test specimen being carried out between the arc of the test mold. Also provided in the Marshall apparatus are guide rods 20 carried by the lower arc 17 and upper arc 32 for slidably guiding said arcs toward each other radially of the specimen. As set forth in the Marshall patents, the method therein for testing the flow value required that the flow measurement device, such as a gauge, be manually held against the top of the upper arc of the stability test mold 18 directly over one of the guide rods. The flow meter then had to be manually removed instantly from this position when the tester determined that the measurement stability reading had been obtained on the load measuring valve.

In the instant apparatus, the jackhead 15 extends toward one of the uprights 12 of the testing apparatus 10. A rod 21 is then mounted onto the jackhead and extends upwardly and has mounted on the top thereof an arm 22. This arm 22 is preferably curved, for reasons explained later, and is pivotally mounted onto the rod 21. Locking means, such as a thumb screw 23, are provided to lock the arm into the desired position to which it is pivoted. Actuating means 24 comprising a shaft 25 with a cap 26 mounted at the top thereof are affixed to the curved arm.

A flow measuring device 27, such as a flow meter or gauge having an activating pin 31, is attached to an upright 12 of the apparatus. As best illustrated in FIGS. 1 and 2, a hinged bracket 28 is used for the purpose of affixing the measuring device to the upright in which an opening at the rear of the bracket fits about the upright 12 and the hole in front of the bracket fits the flow measuring device 27. The bracket 28 is cut through the center line with a hinge 29 built into the bracket at the rear and a screw and wing nut arrangement 30 used to tighten the bracket about the upright 12 of the testing apparatus 10 and the flow measuring device 27. This arrangement permits proper location of the flow measuring device on the apparatus, particularly if it is desired to modify existing Marshall equipment to incorporate this improvement. The hinged bracket also permits removal of the flow meter 27 to prevent damage thereto during transportation of the testing apparatus to various sites where the paving mixture is to be tested prior to installation.

Referring to FIGS. 1 and 2, it will be noted that the length of the actuating means 24 and placement of the bracket 28 with the flow measuring device 27 are adjusted so that the actuating pin 31 of the measuring device is in contact with the cap 26 of the actuating means when testing is to begin of a sample. Not shown is a conventional compression spring inserted in the flow-measuring device 27 to return the activating pin 31 to its original position after testing of the sample is completed.

As previously indicated, the arm 22 is pivoted onto the rod to enable it to be swiveled and moved from under the flow meter permitting rapid and easy removal of the test sample. Once a new test sample is inserted into the testing mold, the arm 22 can be pivoted back into position with the actuating means locked into place by turning the thumb screw 23 and further testing carried out.

In testing for flow value by means of the instant apparatus, the irregularities due to the flow meter being either improperly held against the top of the upper arc of the test mold or the use of improper pressure by the individual are eliminated. Rather, when the specimen is in position for testing, and the activating pin 31 of the flow meter 27 is set against the cap 26, the flow meter is adjusted to zero. Load is applied to the specimen by driving the screw jack. As the load is thus being applied, the flow meter is measuring the deflection or distortion of the specimen, otherwise known as the flow value. The instant the dial indicates the maximum load is obtained, movement of the screw jack is stopped with both the compression and flow value thus being recorded. The machine can then be reversed to lower the jackhead 15 and remove the test sample and for insertion of another sample.

It will be understood that it is intended to cover all changes and modifications of the disclosure of the invention herein chosen for the purpose of illustration which do not constitute departures from the spirit and scope of the invention.

What is claimed is:

1. In apparatus for determining the quality and durability of bituminous paving mixtures by testing specimens of such paving mixture, said apparatus having a base, uprights extending from outer portions of said base, a jackhead mounted on a screw jack extending upwardly from a central portion of said base, upper and lower mold members, and means removably supporting the mold members in a vertical position upon said jackhead, the improvement comprising a jackhead extended at one end towards one of said uprights, an upstanding rod affixed to the extended end of said jackhead, a curved arm pivotally mounted to said rod and being of a length sufficient to extend partially about said upright when pivoted, locking means adapted to lock said arm in any position to which it is pivoted, an adjustable hinged bracket attached to said upright, a flow measurement device removably attached to an upright of said apparatus, and means connected to said curved arm and adapted to engage and actuate said flow measurement device during testing.

* * * * *